US006874918B2

United States Patent
Tawa et al.

(10) Patent No.: US 6,874,918 B2
(45) Date of Patent: Apr. 5, 2005

(54) HEADLAMP DEVICE FOR VEHICLE

(75) Inventors: Yuki Tawa, Shizuoka (JP); Masaaki Ishikawaa, Shizuoka (JP); Toshihisa Hayami, Shizuoka (JP); Atsushi Sugimoto, Shizuoka (JP); Hideki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 76 days.

(21) Appl. No.: 10/224,144

(22) Filed: Aug. 20, 2002

(65) Prior Publication Data

US 2003/0039124 A1 Feb. 27, 2003

(30) Foreign Application Priority Data

Aug. 21, 2001 (JP) ..................................... P.2001-250166

(51) Int. Cl.[7] .................................................. B60Q 1/12
(52) U.S. Cl. .......................... 362/465; 362/466; 362/43; 701/49; 340/468
(58) Field of Search .............................. 362/39, 41, 43, 362/45, 460, 464, 465, 507, 512, 513, 514, 115, 543, 524, 466, 467; 340/457.2, 465, 468; 315/81, 82; 701/36, 49; 307/10.8, 9.1, 10.1

(56) References Cited

U.S. PATENT DOCUMENTS

| 4,482,939 A | * | 11/1984 | Tishman | 362/513 |
|---|---|---|---|---|
| 5,580,148 A | * | 12/1996 | Liao | 362/493 |
| 5,588,733 A | * | 12/1996 | Gotou | 362/37 |
| 5,707,129 A | | 1/1998 | Kobayashi | 362/464 |
| 6,547,424 B2 | * | 4/2003 | Hasumi et al. | 362/465 |
| 2002/0158514 A1 | * | 10/2002 | Izawa | 307/10.8 |

FOREIGN PATENT DOCUMENTS

| EP | 0 507 273 A1 | 10/1992 |
|---|---|---|
| GB | 2 337 810 A | 12/1999 |
| JP | 401111548 A * | 4/1989 |
| JP | 2001151011 A | 6/2001 |
| JP | 2001-325816 | 11/2001 |
| JP | 2001-325817 | 11/2001 |
| WO | WO 96/188524 | 6/1996 |

* cited by examiner

Primary Examiner—Sandra O'Shea
Assistant Examiner—Hargobind S. Sawhney
(74) Attorney, Agent, or Firm—Fish & Richardson P.C.

(57) ABSTRACT

A headlamp device for a vehicle includes a first light distribution controlling portion moving light irradiated forward from a light source in a lateral direction of the vehicle, and a second light distribution controlling portion moving the light irradiated forward from the light source in a vertical direction of the vehicle. A light distribution is controlled in response to a signal sent from the first light distribution controlling portion to the second light distribution controlling portion.

20 Claims, 5 Drawing Sheets

HEADLAMP DEVICE FOR VEHICLE

BACKGROUND OF THE INVENTION

1. Field of the Invention

The present invention relates to a novel headlamp device for a vehicle. More specifically, the invention relates to a technique for obtaining optimum light distribution corresponding to various running situations of a vehicle.

2. Description of the Related Art

In a conventional headlamp device for a vehicle, an irradiation range is limited in order to prevent a glare from being given to a car running in the opposite direction and a car running ahead. Therefore, there is a problem in that irradiation is not carried out in a turning direction to be a direction in which a driver wants to perform observation most greatly during turning.

There has been proposed a headlamp device for a vehicle using a lateral light distribution control method in which a reflector is rotated in a lateral direction depending on a progress direction, thereby turning light distribution in the direction of the sight line of a driver.

The conventional headlamp device for a vehicle using a lateral light distribution control method has such a structure that a reflector is rotated laterally with respect to a body fixed to a vehicle body. Therefore, there is a problem in that the rotating shaft of the reflector is tilted with respect to the ground when the pitch angle of the vehicle body fluctuates. When the reflector is rotated laterally with the rotating shaft tilted with respect to the ground, the locus of movement in an irradiating position onto a road with the rotation is not described circularly so that a state of distortion is brought. Consequently, the distortion of a light distribution pattern for irradiating the road or the distortion of a cut line is generated (FIGS. 9(a) to 9(c) show a light distribution pattern "a" obtained when the reflector is rotated to the left, FIG. 9(a) showing the case in which the pitch angle is zero, that is, the vehicle is set in a horizontal state, FIG. 9(b) showing the case in which the vehicle is tilted forward, and FIG. 9(c) showing the case in which the vehicle is tilted rearward), and a visibility is adversely affected and a glare is given to a car running in the opposite direction, and furthermore, a feeling of physical disorder is given to a driver.

SUMMARY OF THE INVENTION

Accordingly, the invention has an object to obtain optimum light distribution depending on various running situations of a vehicle.

In order to solve the problems, the invention provides a headlamp device for a vehicle comprising light distribution lateral-direction variable means (first light distribution controlling portion) for moving light irradiated forward from a light source in a lateral direction of the vehicle, and light distribution vertical-direction variable means (second light distribution controlling portion) for moving the light irradiated forward from the light source in a vertical direction of the vehicle, wherein light distribution is controlled in response to a signal sent from the light distribution lateral-direction variable means to the light distribution vertical-direction variable means.

In the headlamp device for a vehicle according to the invention, accordingly, the control in a vertical direction and the control in a lateral direction of the light distribution are correlated with each other. Consequently, it is possible to obtain optimum light distribution depending on running situations.

In order to solve the problems, the invention provides another headlamp device for a vehicle comprising light distribution vertical-direction variable means for moving light irradiated forward from a light source in a vertical direction of the vehicle, and a lateral progress direction sensor for detecting a direction of progress in a forward and lateral direction of the vehicle, wherein light distribution is controlled in response to a signal sent from the lateral progress direction sensor to the light distribution vertical-direction variable means.

In the headlamp device for a vehicle according to the invention, the control in the vertical direction of the light distribution is correlated with the progress in the lateral direction of the vehicle. Consequently, it is possible to obtain optimum light distribution depending on running situations.

According to the second aspect of the invention, the light distribution vertical-direction variable means moves the light distribution downward interlockingly with the movement of the light distribution by the light distribution lateral-direction variable means as an amount of movement of the light distribution in the lateral direction is larger. Therefore, it is possible to reliably prevent a glare from being given to a car running in the opposite direction and a pedestrian.

According to the third aspect of the invention, an amount of downward movement of the light distribution which is carried out by the light vertical-distribution direction variable means is larger in the case in which the light distribution is moved to a side of a car running in an opposite direction than the case in which the light distribution is moved to a side of a car running ahead by the light distribution lateral-direction variable means. Therefore, it is possible to more reliably prevent a glare from being given to a car running in the opposite direction.

According to the fourth aspect of the invention, the movement of the light distribution which is carried out by the light distribution vertical-direction variable means is interlocked with a vehicle speed and the amount of downward movement is increased as the vehicle speed is reduced. Therefore, a visibility can be increased in a closer part to a vehicle during running at a low speed.

According to the fifth aspect of the invention, the light distribution vertical-direction variable means changes an amount of movement of the light distribution in a vertical direction at time of running on a curved road respectively for right and left lamps thereby corresponding to rolling at time of cornering. Therefore, it is possible to obtain light distribution in which the lateral tilt of the vehicle is offset at time of the cornering.

According to the sixth aspect of the invention, the light distribution lateral-direction variable means and the light distribution vertical-direction variable means laterally divide and downward move the light distribution of the left and right lamps respectively if a vehicle backup signal is input, and enhance a visibility on a forward side in the vicinity of the vehicle. Therefore, it is possible to enhance a visibility on the forward side in the vicinity of the vehicle that a driver wants to visually recognize at time of backward movement.

Moreover, the invention provides another headlamp device for a vehicle comprising light distribution vertical-direction variable means for moving light irradiated forward from a light source in a vertical direction of the vehicle, and a lateral progress direction sensor for detecting a direction of progress in a forward and lateral direction of the vehicle, wherein light distribution is controlled in response to a signal sent from the lateral progress direction sensor to the light distribution vertical-direction variable means.

In the headlamp device for a vehicle according to the invention, accordingly, the control of the light distribution in the vertical direction is correlated with the progress in the lateral direction of the vehicle. Consequently, it is possible to obtain optimum light distribution depending on running situations.

While only a certain embodiment of the invention has been specifically described herein, it will be apparent that numerous modifications may be made thereto without departing from the spirit and scope of the invention.

DETAILED DESCRIPTION OF THE PREFERRED EMBODIMENTS

Figure 1:
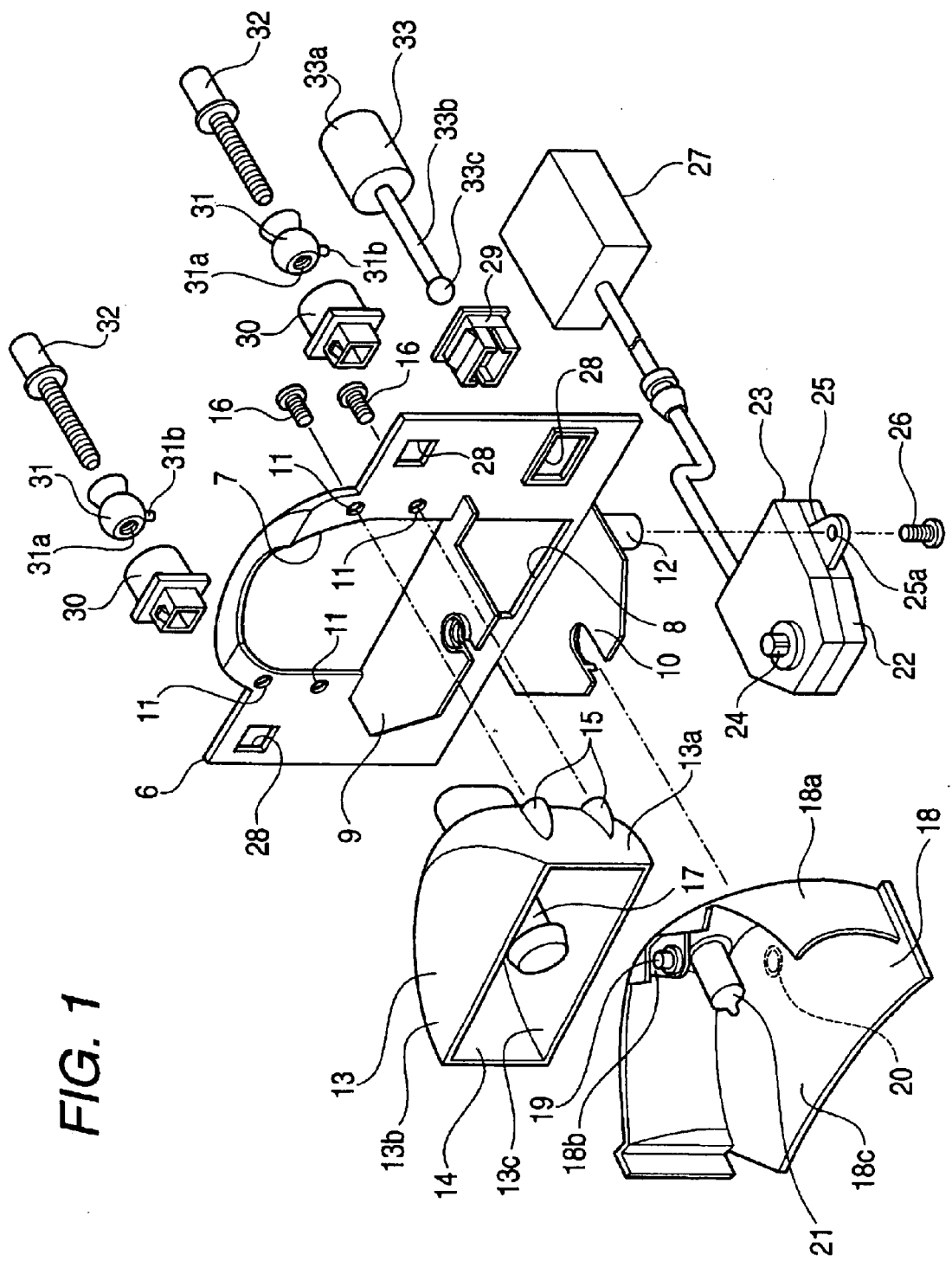
FIG. 1 is an exploded perspective view showing the main part of a headlamp for a vehicle according to an embodiment of a headlamp device of the invention.

An embodiment of a headlamp device for a vehicle according to the invention will be described below with reference to the accompanying drawings.

A headlamp device 1 for a vehicle comprises a headlamp 2 for a vehicle.

The headlamp 2 for a vehicle includes a lamp body 4 having a concave portion 3 which is opened forward. An open surface 4a of the lamp body 4 is covered with a transparent front cover 5 (see FIG. 2). Although the front cover 5 is not provided with a lens step, the lens step may be provided depending on a light distribution pattern to be required.

Two reflectors are provided in the concave portion 3 of the lamp body 4 through a bracket 6 in a vertical arrangement state. The bracket 6 is frame-shaped to have large openings 7 and 8 arranged vertically, and support plates 9 and 10 opposed vertically in parallel with each other are protruded forward from a position in which the lower opening 8 is interposed therebetween. Screw insertion holes 11 are formed in portions positioned on both sides of the upper opening 7. Moreover, two attachment bosses 12 (one of them is shown in FIG. 1) are protruded laterally apart from each other at the lower end of the bracket 6 (see FIG. 1).

A main reflector 13 is fixed to almost the upper half part of the bracket 6. The main reflector 13 includes a reflecting surface portion 13a having a reflecting plane 14 on a front surface, an upper surface portion 13b and a lower surface portion 13c. The front surface of the reflecting surface portion 13a, that is, the reflecting plane 14 has such a shape that an upper portion is cut out like a long band in a lateral direction as seen from a front part in the vicinity of the optical axis of a revolution paraboloid. Screw bosses 15 (one of sides is shown in FIG. 1) are protruded in a position close to both left and right ends of the rear face of the reflecting surface portion 13a, respectively.

The main reflector 13 is fixed to the bracket 6 by attaching, to the screw bosses 15, fixing screws 16, inserted through the screw insertion holes 11, of the bracket 6 from the back. Almost the rear half part of the main reflector 13 is inserted through the upper opening 7 of the bracket 6 and is thus protruded toward the rear side of the bracket 6 (see FIG. 2).

A light source bulb 17 is removably supported on the main reflector 13. Light distribution to be the basis of a low beam is formed by the main reflector 13 and the light source bulb 17.

A subreflector 18 is supported on the almost lower half part of the bracket 6 to be rotatable in a lateral direction.

The subreflector 18 includes a reflecting surface portion 18a taking such a shape that the almost central part of a revolution paraboloid is cut out horizontally, and upper and lower surface portions 18b and 18c. The upper surface portion 18b is formed to have such a shape as to be protruded slightly forward from a central part in the lateral direction of the upper edge of the reflecting surface portion 18a, and the lower surface portion 18c is formed to have such a shape as to be protruded forward from the whole lower edge of the reflecting surface portion 18a (see FIG. 1). A supported shaft 19 is protruded upward from the tip portion of the upper surface of the upper surface portion 18b. A supported shaft 20 is protruded downward from a position close to the rear end of the lower surface of the lower surface portion 18c, that is, a position corresponding to the supported shaft 19 formed on the upper surface portion 18b.

A light source bulb 21 is supported on the central part of the rear portion of the reflecting surface portion 18a in the subreflector 18 (see FIG. 1).

The supported shaft 19 of the subreflector 18 and the supported shaft 20 are rotatably supported on the support plate 9 of the bracket 6 and the support plate 10 of the bracket 6, respectively. Consequently, the subreflector 18 is supported on the bracket 6 to be rotatable in the lateral direction.

A lateral driving portion 22 for rotating the subreflector 18 is supported on the lower end of the bracket 6. The lateral driving portion 22 accommodates a driving source such as a motor or a solenoid and necessary elements in a case body 23, and a rotating shaft 24 protruded upward is rotated by the driving operation of the driving source. Moreover, attached pieces 25 and 25 (one of them is shown in FIG. 1) are protruded from the left and right side surfaces of the case body 23, and screw insertion holes 25a and 25a are formed on the attached pieces 25 and 25.

Fixing screws 26 and 26 (one of them is shown in FIG. 1) inserted through the screw insertion holes 25a and 25a of the attached pieces 25 and 25 from below are screwed into the attachment bosses 12 and 12 of the bracket 6 so that the lateral driving portion 22 is attached to the lower end of the bracket 6. At the same time, the rotating shaft 24 of the lateral driving portion 22 is coupled to the lower supported shaft 20 of the subreflector 18.

The driving source of the lateral driving portion 22 which is not shown is driven by a lateral control ECU (electronic control unit) 27. The lateral control ECU 27 transmits a driving signal corresponding to a steering operation to the lateral driving portion 22 so that the rotating shaft 24 is rotated at a predetermined angle in a predetermined direction in response to the driving signal, for example.

Accordingly, a sub-beam irradiated by the light source bulb 21 and the subreflector 18 is distributed to the left or right with respect to a principal optical axis which is coincident with the optical axis of the main reflector 13. Consequently, the direction of progress is irradiated in advance so that forward irradiation can reliably be carried out at time of running on a curved road or curving at an intersection, resulting in maintenance of traffic safety.

The bracket 6 is tiltably supported on the lamp body 4.

The bracket 6 has attachment holes 28, 28 and 28 formed on the left and right sides of an upper end and in a lower right part, respectively.

A ball receiving member 29 is supported on the lower right attachment hole 28. The ball receiving member 29 is formed of synthetic resin and is provided with a spherical concave portion which is opened at a rear end and is not shown.

Pivot receiving members 30 and 30 are supported on the upper right and upper left attachment holes 28 and 28 of the bracket 6. The pivot receiving member 30 is also formed of synthetic resin and is provided with a spherical concave portion which is opened at a rear end and is not shown.

Pivot members 31 and 31 are supported on the pivot receiving members 30 and 30. The pivot member 31 has a spherical external shape and has a screwing hole 31a penetrating through a center in a radial direction and an engaging pin 31b protruded from an outer peripheral surface in the radial direction. The pivot member 31 is rotatably received by the spherical concave portion of the pivot receiving member 30 and the engaging pin 31b is engaged slidably with a sliding groove formed in the spherical concave portion (not shown) of the pivot receiving member 30 with an extension in an almost longitudinal direction. Consequently, the pivot member 31 is rotatably supported on the pivot receiving member 30 in the axial and sliding directions of the engaging pin 31b.

Adjusting shafts 32 and 32 are rotatably supported in the upper right and left parts of the rear portion of the lamp body 4, and screwing shafts 32a and 32a of the adjusting shafts 32 and 32 are screwed into the screwing holes 31a and 31a of the pivot members 31 and 31 supported on the upper right and left parts of the bracket 6. Consequently, the upper right and left parts of the bracket 6 are supported by the rotating operation of the adjusting shafts 32 and 32 such that a space formed with the rear part of the lamp body 4 can be adjusted.

A leveling driving portion 33 is supported in the lower right position of the rear part of the lamp body 4. The leveling driving portion 33 has a driving source formed by a motor in a case body 33a, and a leveling shaft 33b protruded from the front end of the case body 33a is moved in a longitudinal direction by the driving operation of the driving source. Then, a ball member 33c formed on the front end of the leveling shaft 33b is fitted in the concave portion of the pivot unit 29 supported on the lower right part of the bracket 6.

Since the bracket 6 is tiltably supported on the lamp body 4 as described above, one of the adjusting shafts 32 and 32 is rotated so that the bracket 6 is tilted in a lateral direction. Accordingly, the irradiation shafts of the reflectors 13 and 18 supported on the bracket 6 are tilted in the lateral direction. Moreover, when the leveling driving portion 33 is driven, the bracket 6 is tilted in a vertical direction so that the irradiation shafts of the reflectors 13 and 18 are tilted in the vertical direction. When the adjusting shafts 32 and 32 are simultaneously rotated in the same direction, the bracket 6 is tilted in the vertical direction.

The headlamp device 1 for a vehicle comprises a leveling ECU (electronic control unit) 34 in addition to the lateral control ECU 27. The driving operation of the lateral driving portion 22 is controlled by the lateral control ECU 27 and the driving operation of the leveling driving portion 33 is controlled by the leveling ECU 34 (see FIG. 2). Furthermore, the headlamp 1 for a vehicle comprises a steering angle sensor 35, a vehicle speed sensor 36 and a vehicle height sensor 37 (see FIG. 2). The steering angle sensor 35 serves to detect a steering angle based on a steering operation, the vehicle speed sensor 36 serves to detect a vehicle speed and the vehicle height sensor 37 serves to detect a space between each of front and rear axles and a vehicle body, thereby detecting the pitch angle of the vehicle body.

Figure 2:
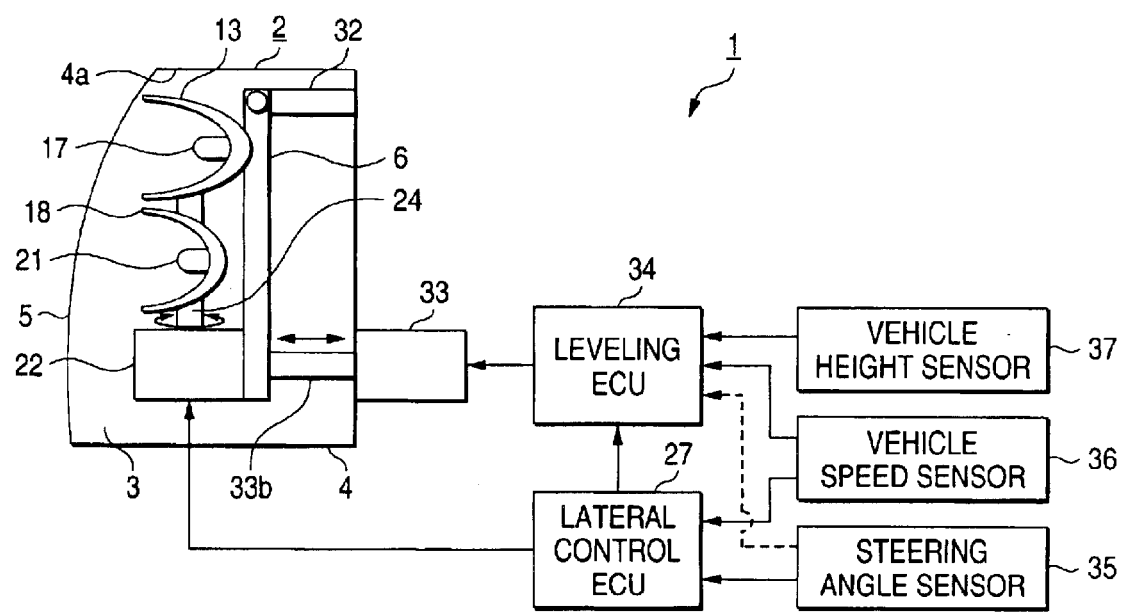
FIG. 2 is a general view schematically showing the headlamp device for a vehicle.

The lateral control ECU 27 controls the lateral driving portion 22 by referring to the results of the detection of the steering angle sensor 35 and the vehicle speed sensor 36 (see FIG. 2). More specifically, the optimum amount of rotation of the subreflector 18 is calculated by the lateral control ECU 27 in response to signals sent from the steering angle sensor 35 and the vehicle speed sensor 36, and the lateral driving portion 22 is driven to carry out the lateral control of light distribution.

Moreover, the leveling ECU 34 controls the driving operation of the leveling driving portion 33 by referring to the results of the detection of the vehicle speed sensor 36 and the vehicle height sensor 37 and the result of the detection of the steering angle sensor 35 obtained through the lateral control ECU 27 (see FIG. 2). More specifically, the leveling control ECU 34 always calculates the pitch angle of a vehicle based on a signal sent from the vehicle height sensor 37, and calculates an optimum leveling amount based on a vehicle speed signal and acceleration information obtained from the vehicle speed signal, that is, an amount of vertical adjustment of the light distribution and drives the leveling driving portion 33, thereby carrying out the vertical control of the light distribution.

The structure of FIG. 2 is conceptually shown. For example, the lateral control ECU 27 is incorporated in the lateral driving portion 22, the leveling ECU 34 is incorporated in the leveling driving portion 33, and the leveling ECU 34 and the lateral control ECU 27 are not always present in such a configuration that both of them can be definitely distinguished from each other but are provided integrally in the same case, are constituted inseparably or are constituted on a software basis in a microcomputer. Thus, it is apparent that portions to play respective parts are present from a conceptual viewpoint. Moreover, the detection of the presence of lateral turning of the vehicle and a steering angle does not depend on the steering angle sensor but any angular speed sensor capable of carrying out the detection can be applied widely, for example. A sensor for detecting the presence of the lateral turning of the vehicle and the steering angle is referred to as a "lateral progress direction sensor" in this specification.

While the leveling ECU 34 receives, through the lateral control ECU 27, the information about the presence of the lateral turning of the vehicle and the steering angle in the above description, it is not restricted but a signal may be directly acquired from the lateral progress direction sensor such as the steering angle sensor 35 or the angular speed sensor as shown in a broken line of FIG. 2.

In the headlamp device 1 for a vehicle, accordingly, the bracket 6 supporting the two reflectors 13 and 18 is vertically tilted by driving the leveling driving portion 33 if necessary, thereby offsetting a fluctuation in the pitch angle of the vehicle such that the rotating shaft of the subreflector 18 for carrying out the lateral control of the light distribution is maintained to be perpendicular to the ground. Thus, it is possible to avoid the unnecessary distortion of the light distribution in the lateral movement of the light distribution.

In the leveling control, generally, a responsiveness is increased during acceleration and deceleration and is reduced during running at a constant speed, thereby avoiding a response delay and enhancing the durability of a device. In the headlamp device 1 for a vehicle, upon receipt of a signal indicating that turning is carried out at time of the turning, that is, the steering angle sensor 35 detects a steering operation is executed, the leveling ECU 34 performs leveling control having the responsiveness increased, thereby minimizing the fall of the rotating shaft of the subreflector 18 with a fluctuation in the pitch angle of the vehicle.

Since the headlamp device 1 for a vehicle has the structure described above, the following light distribution control can be carried out in addition to the light distribution control described above.

Figure 3:
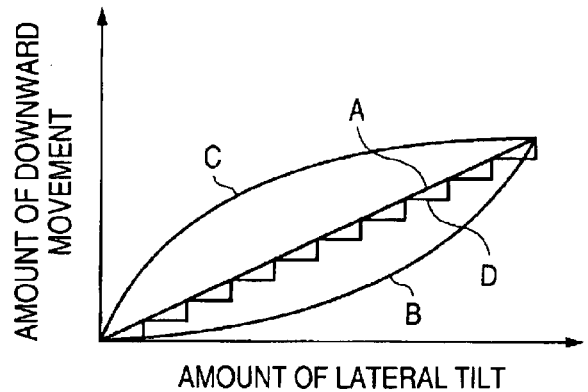
FIG. 3 is a graph showing one of control manners.

As shown in a graph of FIG. 3, when the amount of lateral movement of the light distribution, that is, the amount of lateral rotation of the subreflector 18 is increased, the amount of downward correction of the light distribution, that is, the amount of forward fall of the bracket 6 is increased. In this case, it is preferable that the amount of lateral movement of the light distribution and the amount of downward correction should have such a correlation that the amount of downward correction is increased with an increase in the amount of lateral movement. The amounts may be changed linearly as shown in a curve A of FIG. 3, may be changed stepwise as shown in a curve D or may be changed like a curve as shown in a curve B or C. When the light distribution is moved laterally, the degree of a glare given to a car running in the opposite direction and a pedestrian is increased. By carrying out the control as described above, therefore, it is possible to prevent the glare from being given to the car running in the opposite direction and the pedestrian.

Figure 4:
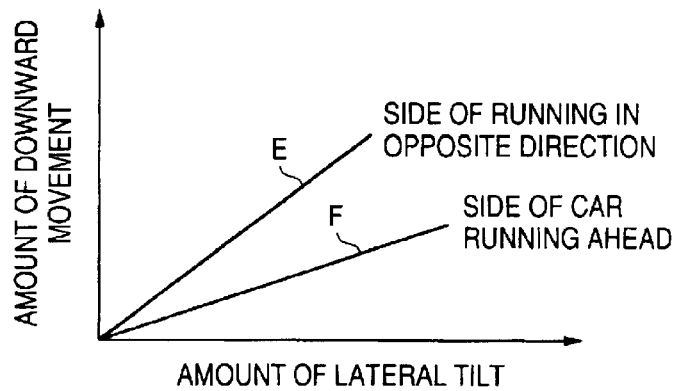
FIG. 4 is a graph showing another control manner together with FIG. 5.
Figure 5:
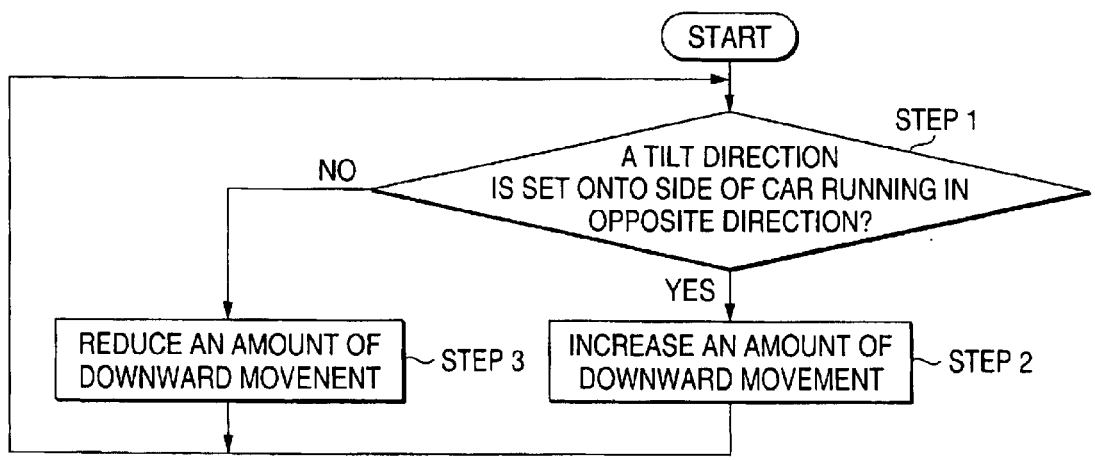
FIG. 5 is a flow chart.

In the case in which the light distribution is laterally moved, moreover, the glare given to the car running in the opposite direction causes a greater danger. As shown in a graph of FIG. 4, therefore, it is possible to reliably prevent the glare from being given to the car running in the opposite direction by more increasing the amount of downward correction in the case in which the light distribution on the side of the car running in the opposite direction is to be moved (see a curve E in FIG. 4) than the case in which the light distribution is to be moved to the side of a car running ahead (see a curve F in FIG. 4). A control method in this case is shown in a flow chart of FIG. 5. In the case in which the steering angle sensor 35 detects that a steering operation is carried out, it is decided whether or not a tilt direction is set onto the side of a car running in the opposite direction (Step 1). If the decision is YES, the amount of downward correction is increased (Step 2). If the decision is NO, the amount of downward correction is reduced (Step 3).

Figure 6:
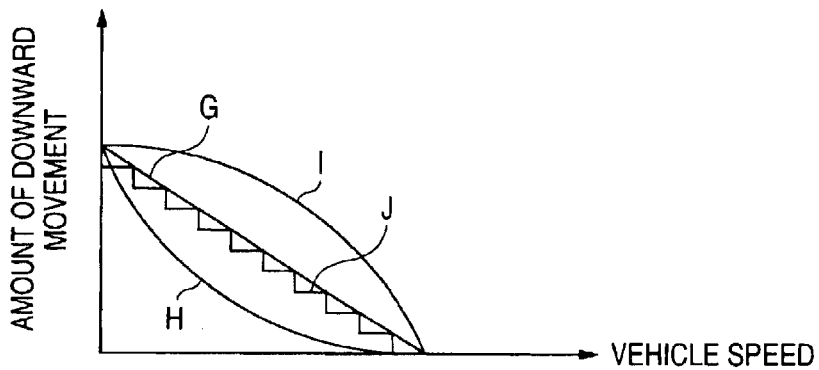
FIG. 6 is a graph showing yet another control manner.

Furthermore, places that a driver wants to visually recognize are different from each other in the case in which a vehicle turns at a high speed and the case in which the vehicle turns at a low speed. More specifically, the driver tries to visually recognize a distant position during the turning at a high speed and tries to visually recognize a closer position during the turning at a low speed. As shown in a graph of FIG. 6, it is preferable that the amount of downward correction should be reduced with an increase in a vehicle speed. Consequently, a more distant position can be recognized visually during the turning at a high speed, and a closer position can be recognized visually during the turning at a low speed. The vehicle speed and the amount of downward correction may have such a correlation as to be changed linearly as shown in a curve G, to be changed like a curve as shown in a curve I or H or to be changed stepwise as shown in a curve J.

Figure 7:
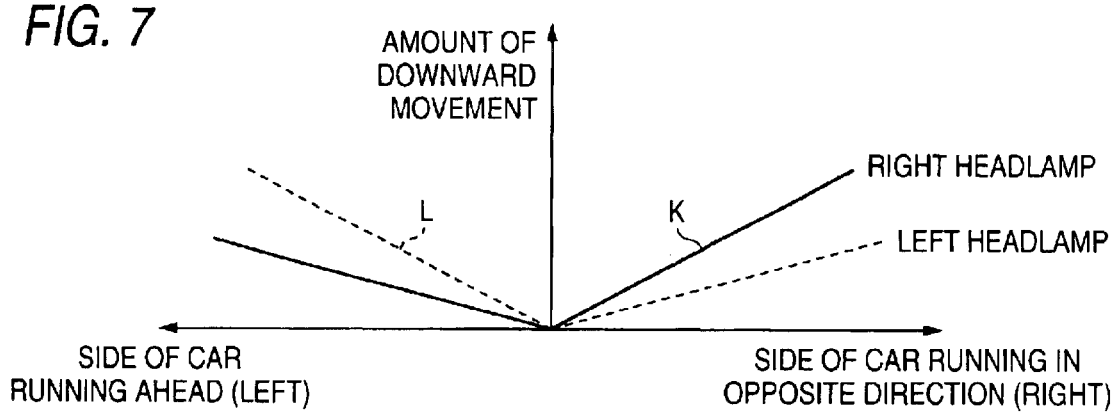
FIG. 7 is a graph showing a further control manner.

Furthermore, the vehicle causes rolling during the turning. Consequently, the left and right heights of the vehicle are different from each other. Accordingly, the light distribution is tilted. As shown in a graph of FIG. 7, the amount of downward correction of the light distribution in the left headlamp 2 for a vehicle (see a broken line L in FIG. 7) is set to be larger than the amount of downward correction of the light distribution in the right headlamp 2 for a vehicle (see a solid line K in FIG. 7) when the vehicle turns to the left, and the amount of downward correction of the light distribution in the left headlamp 2 for a vehicle is set to be smaller than the amount of downward correction of the light distribution in the right headlamp 2 for a vehicle when the vehicle turns to the right. Consequently, it is possible to obtain more excellent light distribution by offsetting a difference in a height between the left and right lamps which is made by the rolling. Please note that this explanation of FIG. 7 is given on the premise of left-hand traffic.

Figure 8:
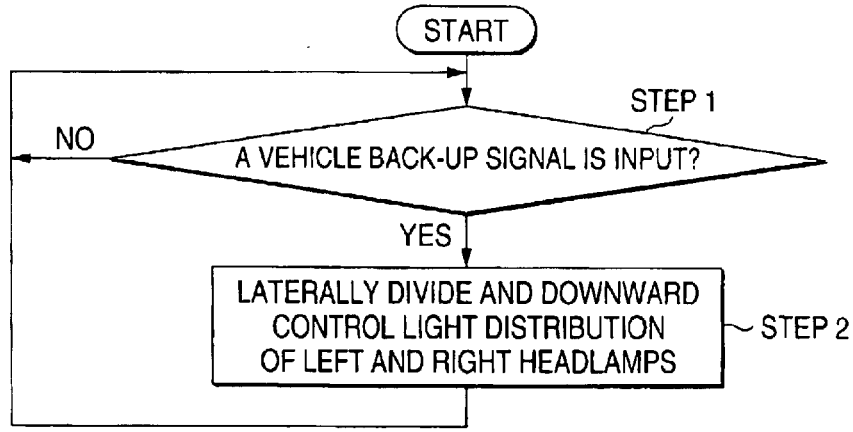
FIG. 8 is a flow chart showing a further control manner.
Figure 9:
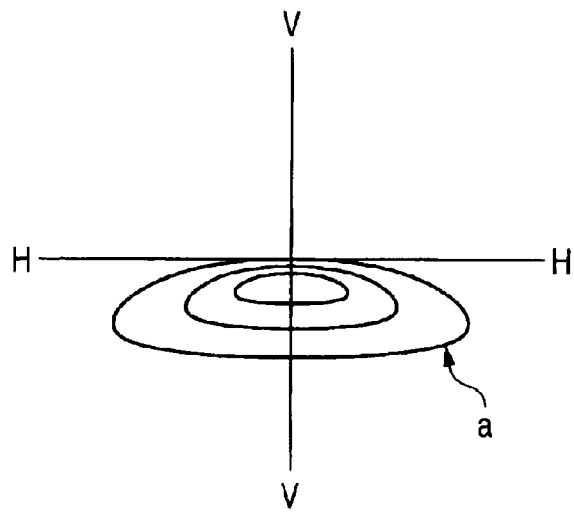
FIGS. 9(a) to 9(c) are diagrams showing light distribution, indicating the problems of a headlamp device for a vehicle according to the conventional art.
Figure 9:
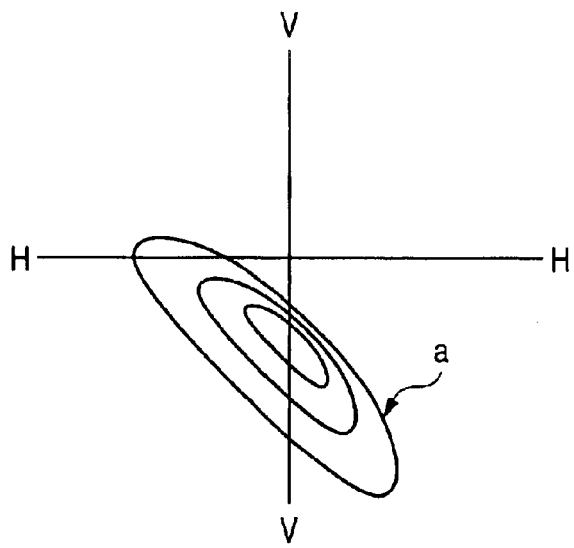
Figure 9:
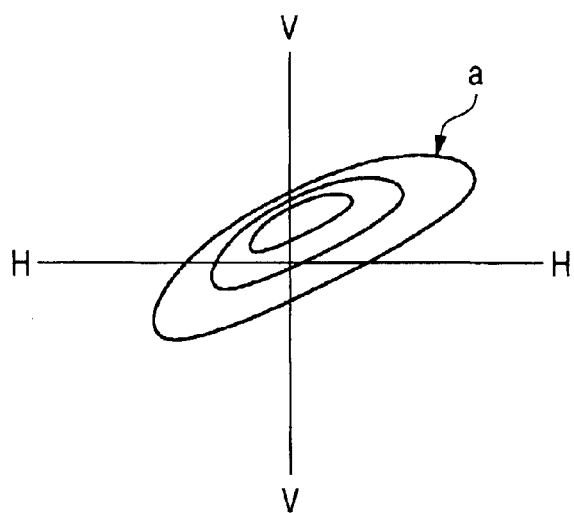

In the case in which the vehicle is moved backward, moreover, the driver does not require a visibility on the distant and forward side of the vehicle but the front side which is close to the vehicle. As shown in a flow chart of FIG. 8, first of all, it is decided whether or not a vehicle back-up signal is input (Step 1). If the decision is YES, the subreflector 18 of the left headlamp 2 for a vehicle is rotated leftwards and the subreflector 18 of the right headlamp 2 for a vehicle is rotated rightwards, and furthermore, the brackets 6 and 6 of the left and right headlamps 2 and 2 for a vehicle are tilted downward, thereby distributing light to left and right parts in the vicinity of the vehicle (Step 2). If the decision is NO, the processing returns to the Step 1.

The shape and structure of each portion described in the embodiment are only illustrative for implementation of the invention and the technical scope of the invention should not be restrictively construed.

As is apparent from the above description, the invention provides a headlamp device for a vehicle comprising light distribution lateral-direction variable means (first light distribution controlling portion) for moving light irradiated forward from a light source in a lateral direction of the vehicle, and light distribution vertical-direction variable means (second light distribution controlling portion) for moving the light irradiated forward from the light source in a vertical direction of the vehicle, wherein light distribution is controlled in response to a signal sent from the light distribution lateral-direction variable means to the light distribution vertical-direction variable means.

In the headlamp device for a vehicle according to the invention, accordingly, the control in a vertical direction and the control in a lateral direction of the light distribution are correlated with each other. Consequently, it is possible to obtain optimum light distribution depending on running situations.

What is claimed is:
1. A headlamp device for a vehicle comprising:
   a first light distribution controlling portion to control distribution of light irradiated forwardly from one or more lamps, wherein the first light distribution controlling portion controls the distribution of light in a lateral direction with respect to the vehicle; and a second light distribution controlling portion to control distribution of light irradiated forwardly from the one or more lamps, wherein the second light distribution controlling portion controls the distribution of light in a vertical direction with respect to the vehicle, wherein control of the light distribution in the vertical direction is correlated with control of light distribution in the lateral direction, and wherein said second light distribution controlling portion moves the light distribution downward interlockingly with movement of the light distribution by said first light distribution controlling portion, and the amount of downward movement increases as an amount of movement of the light distribution in the lateral direction increases.

2. The headlamp device according to claim 1,
wherein said first light distribution controlling portion includes a first reflector, a lateral driving portion laterally rotating said first reflector, and a first electronic control unit driving said lateral driving portion, and
wherein said second light distribution controlling portion includes a bracket supporting said first reflector, a leveling driving portion tilting said bracket, and a second electronic control unit driving said leveling driving portion.

3. The headlamp device according to claim 1,
wherein said first light distribution controlling portion includes a lateral progress direction sensor detecting a direction of progress in a forward and lateral direction of the vehicle,
wherein light distribution is controlled in response to a signal sent from said lateral progress direction sensor to said second light distribution controlling portion.

4. The headlamp device according to claim 3, wherein the one or more lamps include a right lamp and a left lamp, and wherein said second light distribution controlling portion changes the light distribution in a vertical direction by different respective amounts for the right and left lamps to account for occurrence of rolling when the vehicle is turning.

5. A headlamp device for a vehicle comprising:
a first light distribution controlling portion to control distribution of light irradiated forwardly from one or more lamps, wherein the first light distribution controlling portion controls the distribution of light in a lateral direction with respect to the vehicle; and
a second light distribution controlling portion to control distribution of light irradiated forwardly from the one or more lamps, wherein the second light distribution controlling portion controls the distribution of light in a vertical direction with respect to the vehicle,
wherein control of the light distribution in the vertical direction is correlated with control of light distribution in the lateral direction, and
wherein an amount of downward movement of the light distribution which is carried out by said second light distribution controlling portion is larger in a case in which the light distribution by the first light distribution controlling portion is moved laterally with respect to a car traveling in an opposite direction than a case in which the light distribution by the first light distribution controlling portion is moved laterally with respect to a car traveling ahead.

6. The headlamp device according to claim 5,
wherein said first light distribution controlling portion includes a first reflector, a lateral driving portion laterally rotating said first reflector, and a first electronic control unit driving said lateral driving portion, and
wherein said second light distribution controlling portion includes a bracket supporting said first reflector, a leveling driving portion tilting said bracket, and a second electronic control unit driving said leveling driving portion.

7. The headlamp device according to claim 5,
wherein said first light distribution controlling portion includes a lateral progress direction sensor detecting a direction of progress in a forward and lateral direction of the vehicle,
wherein light distribution is controlled in response to a signal sent from said lateral progress direction sensor to said second light distribution controlling portion.

8. The headlamp device according to claim 7, wherein the one or more lamps include a right lamp and a left lamp, and wherein said second light distribution controlling portion changes the light distribution in a vertical direction by different respective amounts for the right and left lamps to account for occurrence of rolling when the vehicle is turning.

9. A headlamp device for a vehicle comprising:
a first light distribution controlling portion to control distribution of light irradiated forwardly from one or more lamps, wherein the first light distribution controlling portion controls the distribution of light in a lateral direction with respect to the vehicle; and
a second light distribution controlling portion to control distribution of light irradiated forwardly from the one or more lamps, wherein the second light distribution controlling portion controls the distribution of light in a vertical direction with respect to the vehicle,
wherein control of the light distribution in the vertical direction is correlated with control of light distribution in the lateral direction, and
wherein the movement of the light distribution which is carried out by said second light distribution controlling portion is interlocked with a vehicle speed, and an amount of downward movement is increased as the vehicle speed is reduced.

10. The headlamp device according to claim 9,
wherein said first light distribution controlling portion includes a first reflector, a lateral driving portion laterally rotating said first reflector, and a first electronic control unit driving said lateral driving portion, and
wherein said second light distribution controlling portion includes a bracket supporting said first reflector, a leveling driving portion tilting said bracket, and a second electronic control unit driving said leveling driving portion.

11. The headlamp device according to claim 9,
wherein said first light distribution controlling portion includes a lateral progress direction sensor detecting a direction of progress in a forward and lateral direction of the vehicle,
wherein light distribution is controlled in response to a signal sent from said lateral progress direction sensor to said second light distribution controlling portion.

12. The headlamp device according to claim 11, wherein the one or more lamps include a right lamp and a left lamp, and wherein said second light distribution controlling portion changes the light distribution in a vertical direction by different respective amounts for the right and left lamps to account for occurrence of rolling when the vehicle is turning.

13. A headlamp device for a vehicle comprising:
a first light distribution controlling portion to control distribution of light irradiated forwardly from one or more lamps, wherein the first light distribution controlling portion controls the distribution of light in a lateral direction with respect to the vehicle; and
a second light distribution controlling portion to control distribution of light irradiated forwardly from the one or more lamps, wherein the second light distribution controlling portion controls the distribution of light in a vertical direction with respect to the vehicle,
wherein control of the light distribution in the vertical direction is correlated with control of light distribution in the lateral direction, and
wherein the one or more lamps include a right lamp and a left lamp, and wherein said second light distribution controlling portion changes the light distribution in a vertical direction by different respective amounts for the right and left lamps to account for occurrence of rolling when the vehicle is turning.

14. The headlamp device according to claim 13,
wherein said first light distribution controlling portion includes a first reflector, a lateral driving portion laterally rotating said first reflector, and a first electronic control unit driving said lateral driving portion, and
wherein said second light distribution controlling portion includes a bracket supporting said first reflector, a leveling driving portion tilting said bracket, and a second electronic control unit driving said leveling driving portion.

15. The headlamp device according to claim 13,
wherein said first light distribution controlling portion includes a lateral progress direction sensor detecting a direction of progress in a forward and lateral direction of the vehicle,
wherein light distribution is controlled in response to a signal sent from said lateral progress direction sensor to said second light distribution controlling portion.

16. The headlamp device according to claim 15, wherein the one or more lamps include a right lamp and a left lamp, and wherein said second light distribution controlling portion changes the light distribution in a vertical direction by different respective amounts for the right and left lamps to account for occurrence of rolling when the vehicle is turning.

17. A headlamp device for a vehicle comprising:
a first light distribution controlling portion to control distribution of light irradiated forwardly from one or more lamps, wherein the first light distribution controlling portion controls the distribution of light in a lateral direction with respect to the vehicle; and
a second light distribution controlling portion to control distribution of light irradiated forwardly from the one or more lamps, wherein the second light distribution controlling portion controls the distribution of light in a vertical direction with respect to the vehicle,
wherein control of the light distribution in the vertical direction is correlated with control of light distribution in the lateral direction, and
wherein the one or more lamps include a right lamp and a left lamp, and wherein, if a vehicle back-up signal is input, said first light distribution controlling portion turns the right lamp in one lateral direction and the second left lamp in an opposite direction, and said second light distribution controlling portion directs the light distribution of left and right lamps respectively downward, thereby enhancing a visibility on a forward side of the vehicle.

18. The headlamp device according to claim 17,
wherein said first light distribution controlling portion includes a first reflector, a lateral driving portion laterally rotating said first reflector, and a first electronic control unit driving said lateral driving portion, and
wherein said second light distribution controlling portion includes a bracket supporting said first reflector, a leveling driving portion tilting said bracket, and a second electronic control unit driving said leveling driving portion.

19. The headlamp device according to claim 17,
wherein said first light distribution controlling portion includes a lateral progress direction sensor detecting a direction of progress in a forward and lateral direction of the vehicle,
wherein light distribution is controlled in response to a signal sent from said lateral progress direction sensor to said second light distribution controlling portion.

20. The headlamp device according to claim 19, wherein the one or more lamps include a right lamp and a left lamp, and wherein said second light distribution controlling portion changes the light distribution in a vertical direction by different respective amounts for the right and left lamps to account for occurrence of rolling when the vehicle is turning.

* * * * *

UNITED STATES PATENT AND TRADEMARK OFFICE
CERTIFICATE OF CORRECTION

PATENT NO. : 6,874,918 B2
DATED : April 5, 2005
INVENTOR(S) : Yuki Tawa et al.

It is certified that error appears in the above-identified patent and that said Letters Patent is hereby corrected as shown below:

Title page,
Item [75], Inventors, replace "Ishikawaa" with -- Ishikawa --.

Signed and Sealed this

Twenty-eighth Day of June, 2005

JON W. DUDAS
*Director of the United States Patent and Trademark Office*